(12) United States Patent
Vondran, Jr. et al.

(10) Patent No.: US 7,505,172 B2
(45) Date of Patent: Mar. 17, 2009

(54) METHOD AND SYSTEMS FOR PROCESSING PRINT JOBS

(75) Inventors: Gary L. Vondran, Jr., San Carlos, CA (US); Jun Li, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1028 days.

(21) Appl. No.: 10/697,986

(22) Filed: Oct. 31, 2003

(65) Prior Publication Data

US 2005/0094191 A1     May 5, 2005

(51) Int. Cl.
*H04N 1/40* (2006.01)

(52) U.S. Cl. ........................................ 358/1.9; 358/468
(58) Field of Classification Search ....... 358/1.15–1.18, 358/1.9, 2.1, 468
See application file for complete search history.

(56) References Cited

U.S. PATENT DOCUMENTS

| 6,341,018 | B1 | 1/2002 | Vidyanand et al. |
| 6,366,744 | B1 | 4/2002 | Phillips et al. |
| 6,476,931 | B1 | 11/2002 | Aizikowitz et al. |
| 6,559,958 | B2 | 5/2003 | Motamed et al. |
| 6,621,589 | B1 | 9/2003 | Al-Kazily et al. |
| 7,130,073 | B2 * | 10/2006 | Kumar et al. .............. 358/1.16 |
| 2002/0060801 | A1 | 5/2002 | Motamed et al. |

\* cited by examiner

*Primary Examiner*—Thomas D Lee
*Assistant Examiner*—Stephen M Brinich

(57) ABSTRACT

Systems and methods according to the present invention provide the capability to identify, record and employ object reuse in print jobs. Reuse information, e.g., a number of instances of a particular object and/or the pages wherein the object is used, is identified as part of print job processing. Subsequent printing process, e.g., object caching and print job partitioning, can then use the reuse information.

33 Claims, 11 Drawing Sheets

METHOD AND SYSTEMS FOR PROCESSING PRINT JOBS

BACKGROUND

The present invention relates generally to printing techniques and systems and, more particularly, to printing techniques and systems which track object usage in print jobs.

Many systems have been developed for generating hard copy output of information to users, including various types of printers and printing systems. One common use of printers and printing systems is as an output device for computers. When a user initiates a print function, a print job is created by a computer and sent to the printer for printing. Initiating the print job can, for example, be performed using a document generation program such as Microsoft® Word, PowerPoint®, Adobe® Acrobat® and Quark Express®. The print job may include one or more documents (or pages) and generally is structured as a combination of content and layout. The choice of the objects, their placement and the order in which they are placed, defines a document or page's composition and can be specified using Page Description Languages (PDL). Postscript®, PCL, PDF and PPML are examples of page description languages.

Objects, e.g., graphic or text elements, are commonly reused within a page, document, print job and across jobs. However object reuse is difficult to exploit in printing processes. First, many PDL's do not have an explicit means to express reuse. Even though all PDL's can reference the same object or element numerous times, the processing system does not know at the time it is interpreting and rendering an object whether it will be referenced again. Newer languages (e.g., PPML) and language extensions have introduced a reuse tag to indicate that the object or element will be referenced numerous times. However, document generation applications commonly insert duplicate objects into the PDL even though the PDL supports multiple references as well as explicit reuse tagging. For example, MS Word and PowerPoint instantiate all background information in each page even though nearly all of the background is the same across all the document's pages. Secondly, even when reuse is explicitly expressed in the PDL, the processing applications do not know how many references and where in the job the references will occur. Since these systems have finite storage memory and cannot cache every reused tagged object for the entire duration of the job, reused content will be periodically dropped from the cache and some may not be cached at all.

A prior art example is shown in FIG. 1. Therein a 30-page PDF document is submitted for printing. A print server 10 prepares the print job 12 for printing by converting the PDF document into a raster format which can be read by the printer(s) 14 and 16 using, for example, one or more raster image processors (RIP). In this example, the 30-page PDF document is subdivided into three portions for rendering in order to, for example, speed up the print job processing time by using multiple RIP processors. Note that the technique for subdividing the 30-page print document illustrated in FIG. 1 is simply page order, without regard for object reuse.

SUMMARY

Systems and methods according to exemplary embodiments of the present invention generate object reuse information during the processing of print jobs. This reuse information can then be employed during subsequent processing of these print jobs, e.g., to manage cache resources and partition print jobs.

According to one exemplary embodiment of the present invention, a method for processing a print job includes the steps of: selecting an object in the print job; determining whether the object has a match among previously processed objects; and selectively incrementing a number of usages of the object based upon a result of said determining step.

According to another exemplary embodiment of the present invention, a method for processing a print job includes the steps of: selecting an object in the print job; transforming the object into a predetermined coordinate system and at least one predetermined sequence of rendering operations; generating a signature associated with the transformed object; determining whether the object has a match among previously processed objects by comparing the signature with previously stored signatures; and modifying reuse information associated with the object based upon a result of the determining step.

According to a still further exemplary embodiment of the present invention, a method for partitioning a print job into N partitions includes the steps of: generating an object usage list for each page in the print job; linking together each pair of page nodes having at least one common object; assigning a link weight to each link and generating N partitions of the pages based upon the link weights.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description is not intended to limit the invention in any way. Instead, the scope of the invention is defined by the appended claims.

Figure 1:
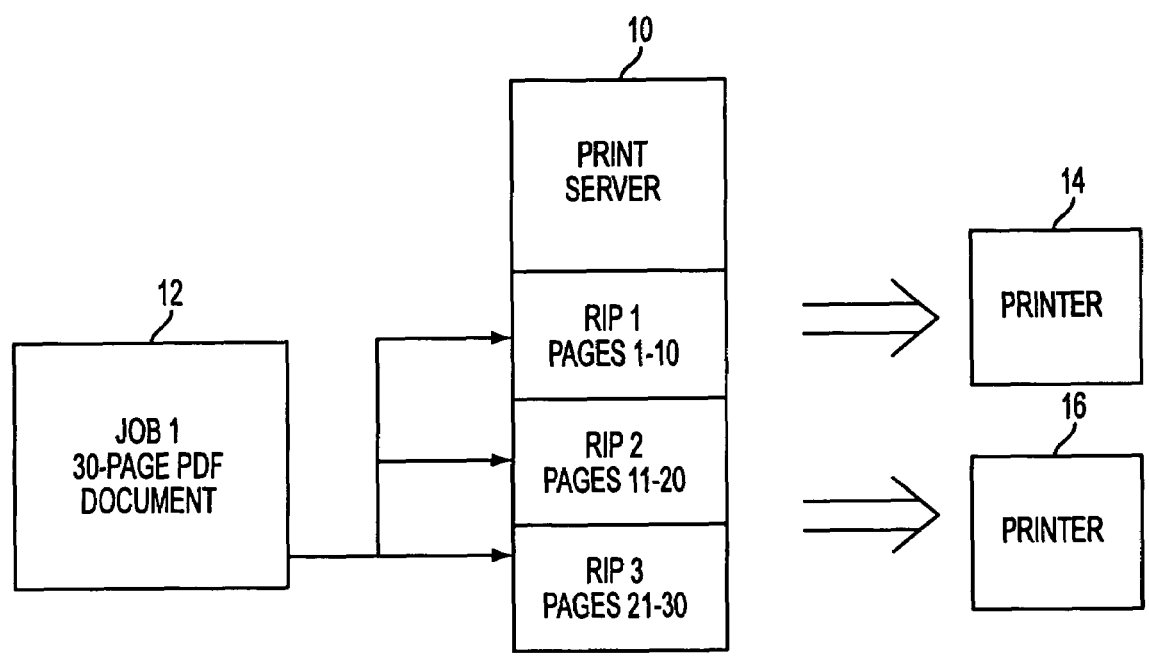
FIG. 1 depicts a conventional technique for processing a print job using multiple RIP processors.
Figure 2:
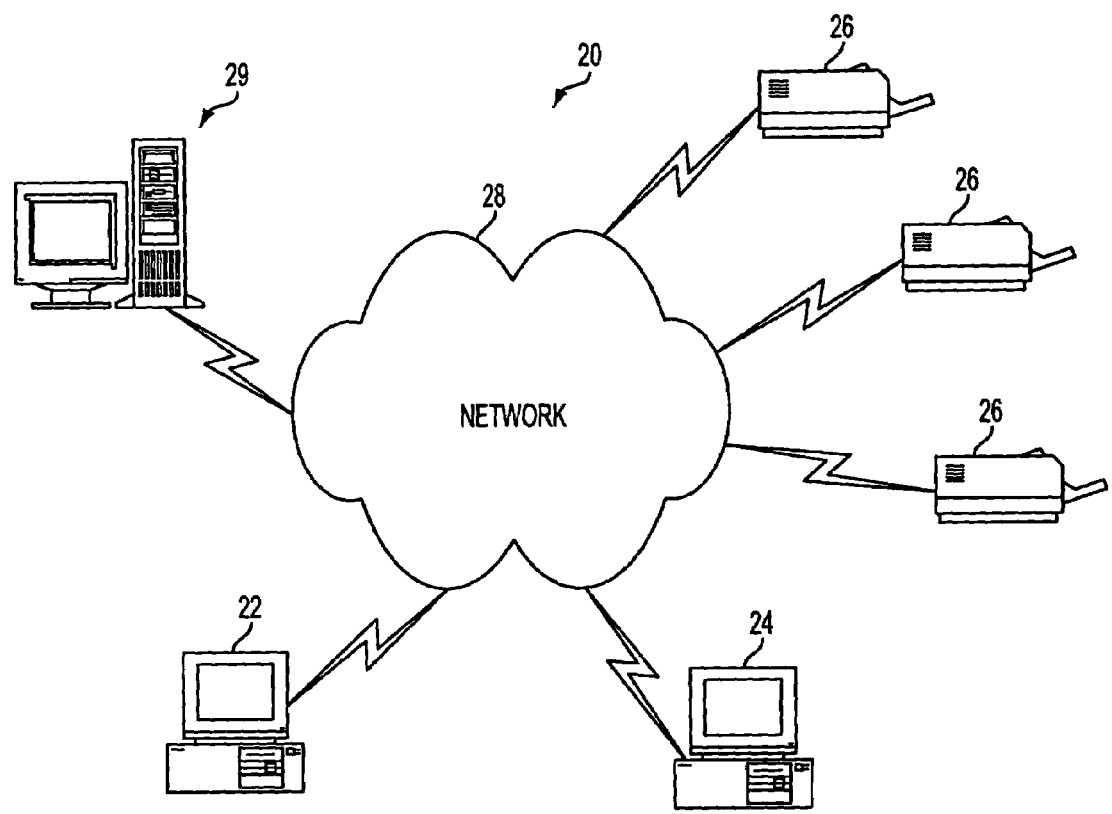
FIG. 2 shows an exemplary network in which the present invention can be implemented.

According to exemplary embodiments of the present invention, object reuse information is recorded during output processing of a PDL and is used as a part of an overall output production processing flow. To provide some context for these exemplary embodiments of the present invention, an exemplary output processing system and flow will first be described with respect to FIG. 2. Generally, the network system 20 of FIG. 2 includes multiple computers 22 and 24 and one or more networked devices illustrated as printers 26. The computers 22 and 24 communicate with the printers 26 over a data communications network 28. As presented herein, computers 22 and 24 are each intended to represent any of a broad category of computing devices including, but not limited to, a business or personal computer, a server, a network device, a set-top box, a communication device, and the like. It should be appreciated that computers 22 and 24 require no special features or attributes to take advantage of the innovative features of printing systems and techniques according to the present invention. In most implementations, computers 22 and 24 include a display device and an input device, such as a keyboard and/or mouse, for example, wherein the central print system may provide a visual user interface, such as a pull-down menu, for example, when invoked by an end user for the purpose of specifying print job processing attributes. In the illustrated example, the data communications network 28 can include one or more of: the Internet, PSTN networks, local area networks (LANs), and private wide area networks (WANs). Communication between computers 22, 24 and printers 26 can be via any of a variety of conventional communication protocols. Client computers 22, 24 transfer data or jobs to printers 26 via network 28. One or more servers 29 may also be coupled to communications network 28. The printers 26 of FIG. 2 can be any of a wide variety of conventional printing or other output devices. Such output devices can be physical devices, such as laser printers, inkjet printers, dot matrix printers, digital press, facsimile machines or plotters, for example. Typically, in a network such as network system 20 communications between a computer 22, for example, and a printer 26 will be via one or more printer servers 29.

According to various exemplary embodiments of the present invention, techniques and mechanisms for generating and using object reuse information can reside in different parts of a printing system. For example, a software and/or hardware object reuse mechanism can be provided as a back-end of the document generation application, as part of an intermediary node such as a print job submission application, job spooler or standalone utility or as the front-end of the output system. In all of these exemplary implementations of the present invention, object reuse information can be used by one or more cache controllers to more efficiently manage the usage of cache memory. Additionally, object reuse can be used to aid in print job restructuring and partitioning in those exemplary embodiments where print job restructuring and partitioning are employed. To illustrate both of these exemplary applications of aspects of the present invention, the following exemplary embodiment describes a system which employs both caching and job restructuring/partitioning however those skilled in the art will appreciate that the present invention is not limited to these exemplary applications.

Figure 3:
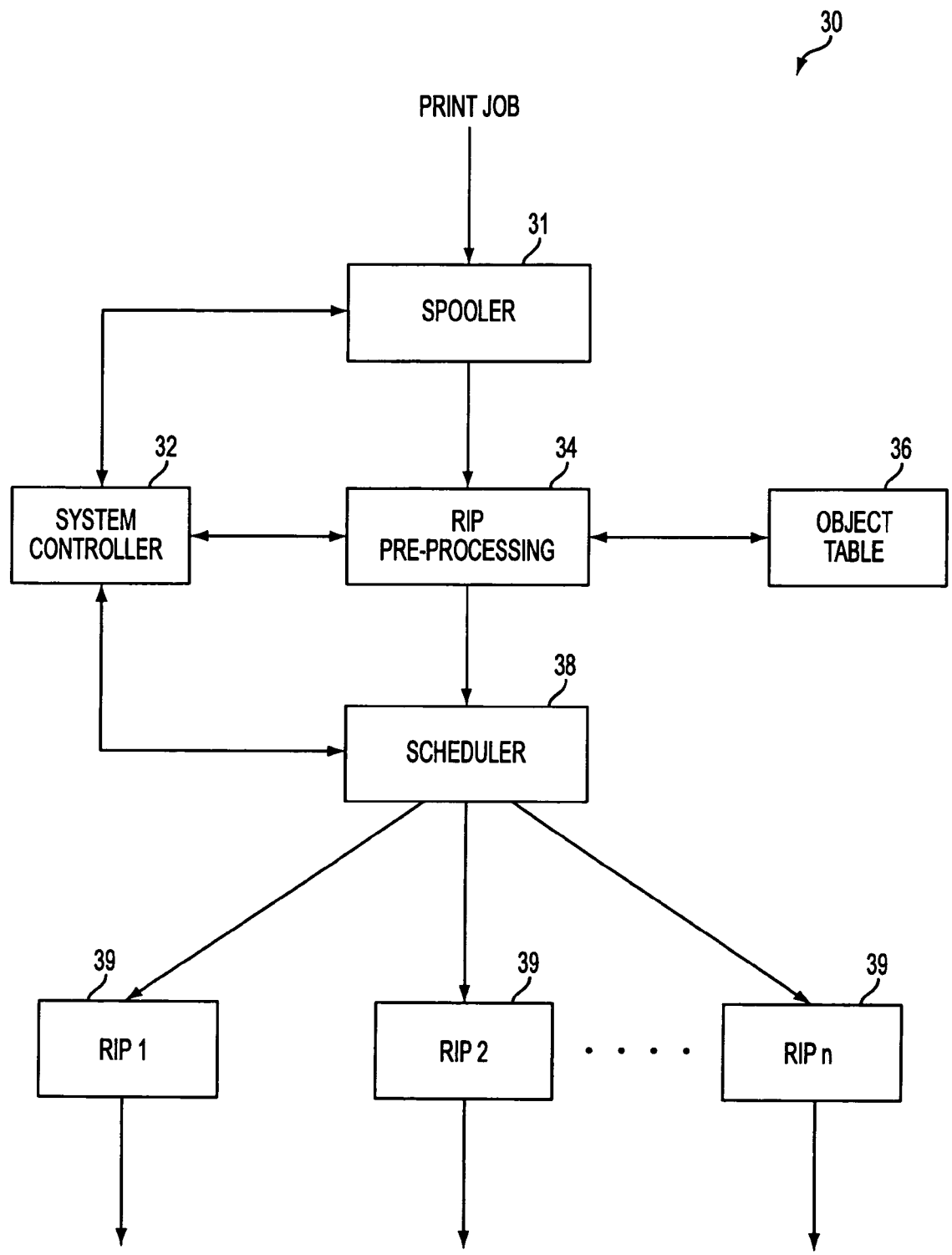
FIG. 3 depicts an exemplary multiple RIP system in which the present invention can be implemented.

Thus, according to one exemplary embodiment of the present invention, the print server 29 may include (or be connected to) multiple RIP processors which rasterize each print job prior to delivering the print job to one or more printers. As mentioned above, RIP processing refers to the process of translating a high level page description of the job to a print ready raster form. By splitting the print job into plural partitions for rasterizing, this portion of the printing process can be accelerated. An exemplary multiple RIP processor device 30 is illustrated in FIG. 3. Therein, each print job (PDL file) is received by a spooler 31 under control of system controller 32 where they are queued for pre-processing in unit 34. Note that spooler 31 can be any desired buffering system, e.g., a so-called "hot folder". Pre-processing unit 34 can perform a number of different functions including, for example, generating an object table 36 for the job and an object list for each page. The object table 36 can include different attributes associated with each object on each page in a print job including object reuse information as will be described in more detail below. Scheduler 38 assigns pages from the print job to various ones of the RIP processors 39. As shown the multiple RIP device 30 may include any number of RIP processors. The assignment of particular pages to particular RIP processors can, for example, be performed based upon the object reuse information in object table 36. The RIP processors 39 rasterize their assigned pages to provide a rasterized output which can be delivered to one or more print engines. Although not shown, the output of one or more of the RIP processors 39 can be combined to provide an input to a particular printer. Alternatively, each RIP processor's output can be routed to a different printer. Exemplary methods for processing print jobs to generate object reuse information according to the present invention will now be described with respect to the flow diagrams of FIGS. 4(a) and 4(b).

Figure 4A:
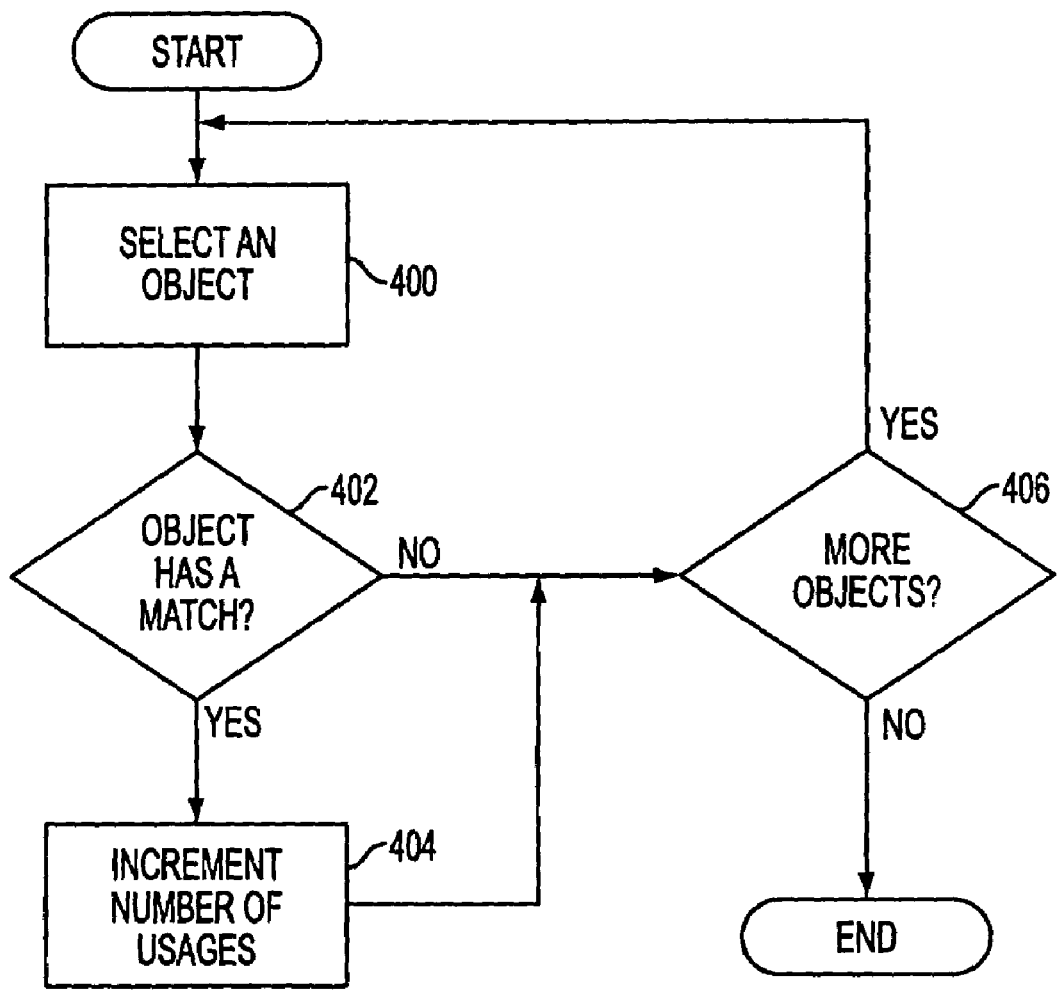
FIGS. 4(a) and 4(b) are flowcharts which illustrate methods for processing print jobs according to exemplary embodiments of the present invention.
Figure 4B:
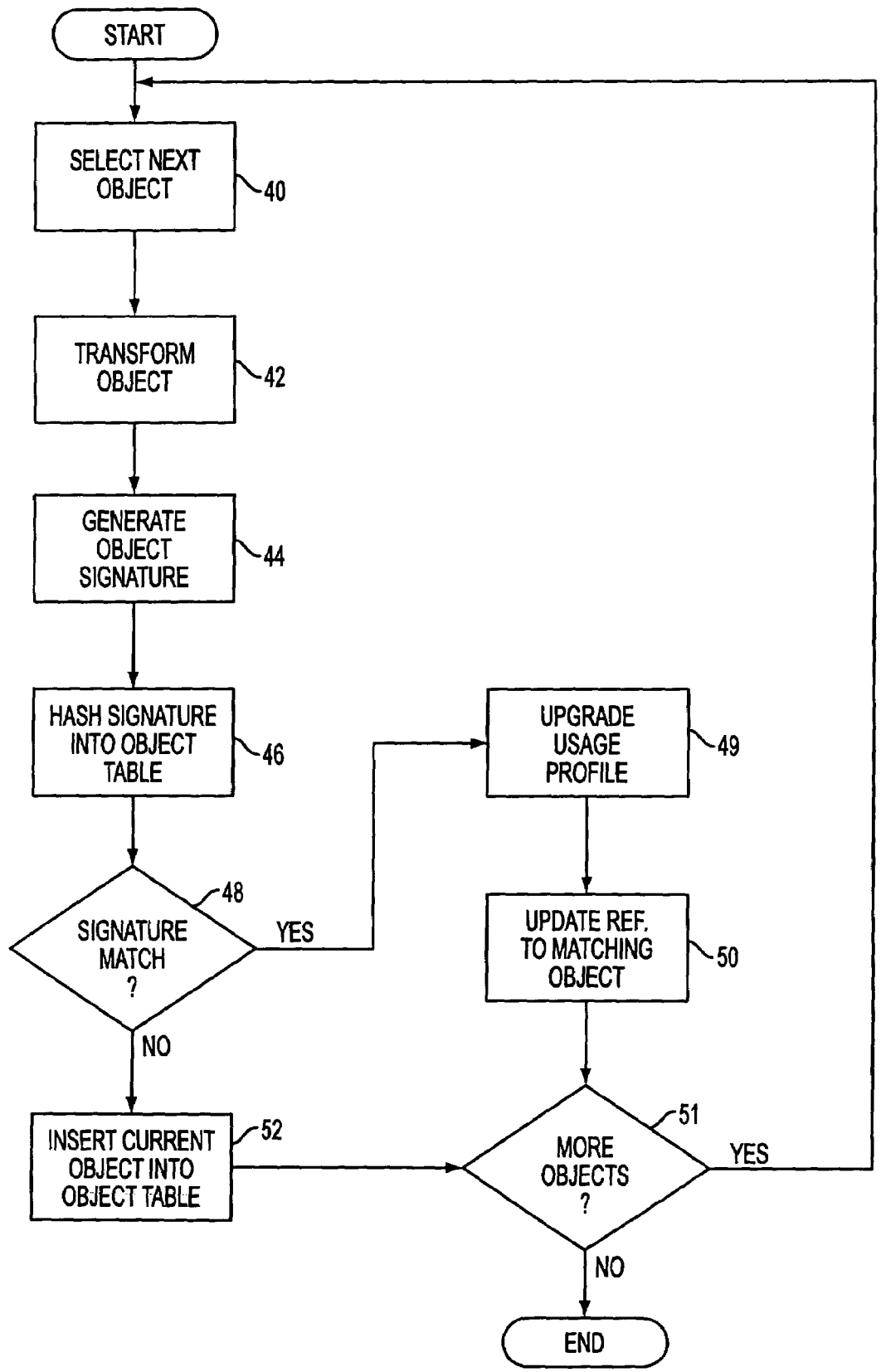
Figure 5:
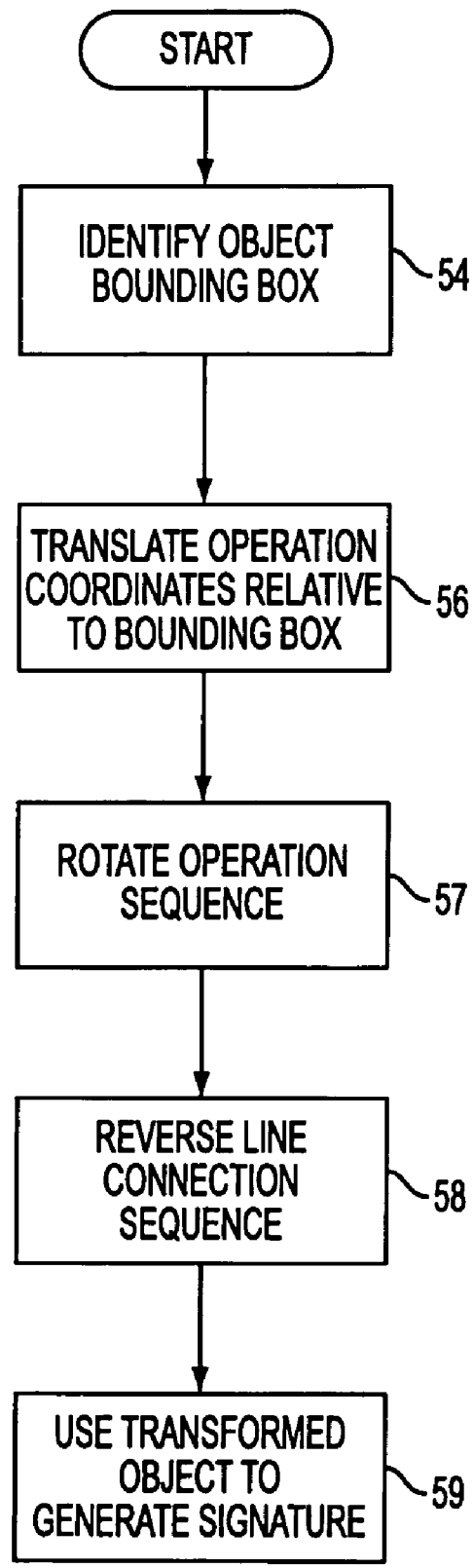
FIG. 5 is a flowchart which illustrates an optional transformation process according to an exemplary embodiment of the present invention

Beginning with FIG. 4(a), a method for processing a print job includes selecting an object for analysis at step 400. If the object has a match as compared with previously processed objects (step 402), then the flow proceeds to step 404 wherein the number of usages within the print job(s) of that object is incremented, e.g., in an object table. Otherwise, the flow moves to step 406 wherein it is determined if additional objects remain. The flow either loops back again or exits based on a result of the decision step 406. Another, more detailed exemplary method for processing print jobs is shown in FIG. 4(b). Therein, each print job is analyzed in pre-processing unit 34 on an object-by-object basis at step 40. A first, optional step involves performing a transformation on the selected object at step 42. This optional step exposes redundant graphic page objects which are expressed in a print job (or across print jobs) using different positional and operation representations. The sub-steps associated with this optional transformation process are depicted in FIG. 5. Therein, page objects are first translated into a position independent representation. This involves identifying the page object's bounding box at step 54 and translating all operation coordinates of the object relative to its bounding box at step 56. Coordinates can be translated to, for example, any corner of the bounding box (e.g., bottom left, top right, minimal (x,y), etc.) or any other point relative to the bounding box as long as the choice is consistent within the job and across jobs for which matching print objects are to be identified. Once the object has been translated into a position independent representation, any graphic operations and coordinates are rotated into a consistent order at step 57. Graphic page objects, whether to be filled or not, are drawn using a series of lines, strokes and curves. The same resultant graphic object may be drawn in various ways. This optional transformation step, according to exemplary embodiments of the present invention, rotates these series of draw operations such that all identical page graphic elements will have the same position independent operation sequence. This may not only involve rotation of the operations for consistency, but also a reversal of the operation sequence used to connect the lines at step 58. This reversal step identifies two objects as being a match for reuse purposes even though some or all of their line connections are performed in a different order. Note, coordinate rotation and reversal are not applied to lines having line caps (e.g., rounded, square and butt line caps) since these only affect unconnected line ends, which will not change with rotation or reversal. Further, perceived line caps such as arrows are actually drawn using lines, strokes, curves, fills, etc. in PDL's and will be correctly preserved. Lastly, at step 59, a transformed object is generated for use in signature generation.

Returning to the pre-processing flow of FIG. 4, regardless of whether the optional transformation step 42 is performed or not, a signature is generated for each object as it is encountered at step 44. The signature is a unique identifier based on the composition of the object. Cyclic redundancy check (CRC), MD5, checksum and combinations of these methods can, for example, be used as signature generation techniques. Once the signature is generated, it is used to hash into an object table 36 at step 46. If the object has been previously processed by pre-processing unit 34, a signature match in the object table 36 will occur at step 48. The usage profile of this particular object can then be updated in the object table at step 49. Additionally, the reference to the object that matched the object in the object table is replaced with a reference to the matching object in the table at step 50. The object which is currently being analyzed can then be dropped since it has been determined to be a duplicate and all of its references have been updated to the matching object in the table. The flow can then proceed to step 51. If more objects are pending for analysis the flow returns to step 40 where another object is selected for processing, otherwise the pre-processing flow terminates and the system controller 32 can trigger the scheduler 38 to trigger the print job(s) to partition the print job(s) for rasterizing. If no match occurs at step 48, the current object has not been previously encountered and is inserted into the object table 36 at step 52.

Various techniques can be used to update the object usage profile at step 50. According to one exemplary embodiment of the present invention, the usage profile can be implemented to extend the object table 36 to include a field associated with each unique entry (object) that holds a count of the number of occurrences of each unique entry encountered during the pre-processing of a print job or jobs. This corresponds to the number of uses of each unique object. From this reuse information, the caching mechanism can make determinations as to the object caching priorities based on the number of uses and which objects may be dropped from the cache because they have no further references. Caching mechanisms can include, for example, a caching mechanism associated with each RIP processor 39 or any other caching mechanism which is downstream of the reuse information generation in the printing process.

According to other exemplary embodiments, the usage profile may also include (or alternatively include) a record of the pages in which each unique object is referenced. With this usage profile information the cache mechanism not only knows the location of last use of each object, but also where all uses will occur. The cache mechanism can thus make informed decisions on which content to drop, prefetch or re-render based on the distance to next use. In addition this exemplary implementation of usage profiles according to the present invention provides useful information for restructuring and partitioning jobs for parallel rendering systems such as that shown in FIG. 3. For example, with a page record of object reuse, the scheduler 38 can restructure or partition the print job(s) such that pages with common objects are grouped together. This, in turn, is beneficial in maximizing cache and rendering efficiency. For example, if partitioning a job to be processed by multiple rendering systems, grouping pages based on object usage will minimize the number of cache instances of the object across the multi-RIP system caches, as well as minimize re-rendering of the objects on multiple RIP systems or transfers between their caches.

Figure 6:
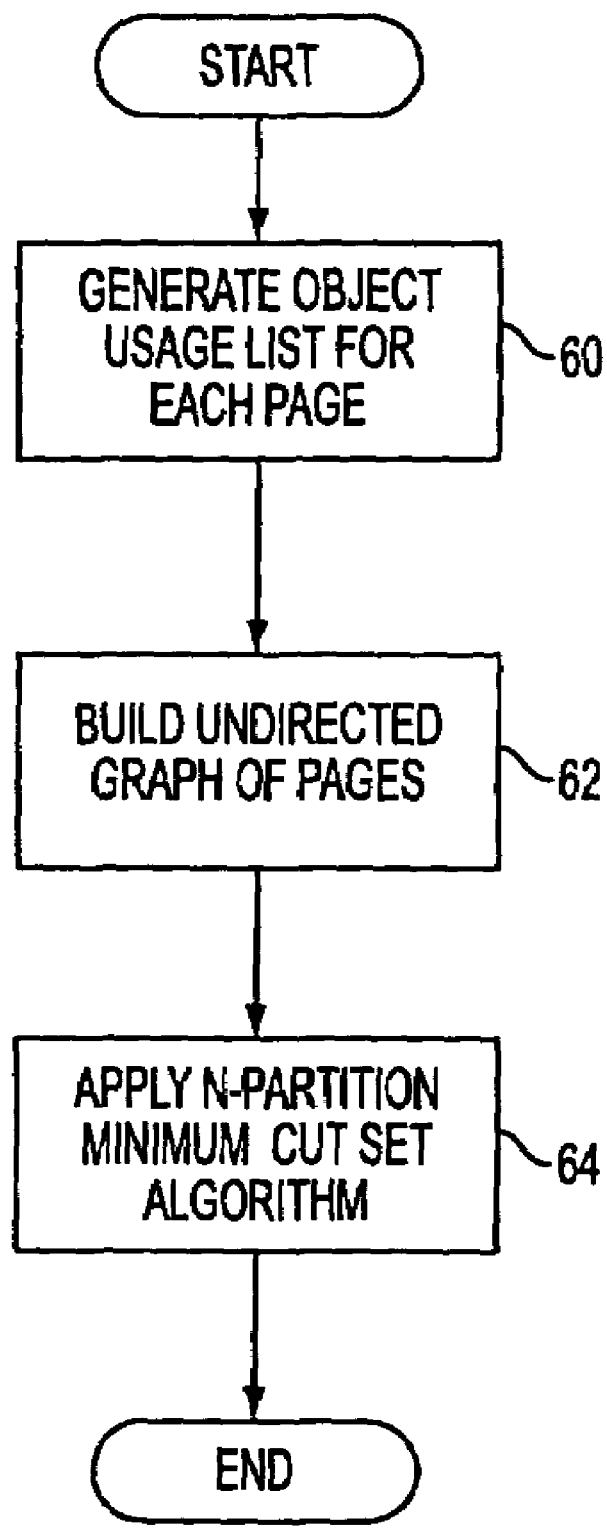
FIG. 6 is a flowchart which illustrates a method for partitioning a print job according to an exemplary embodiment of the present invention.
Figure 7:
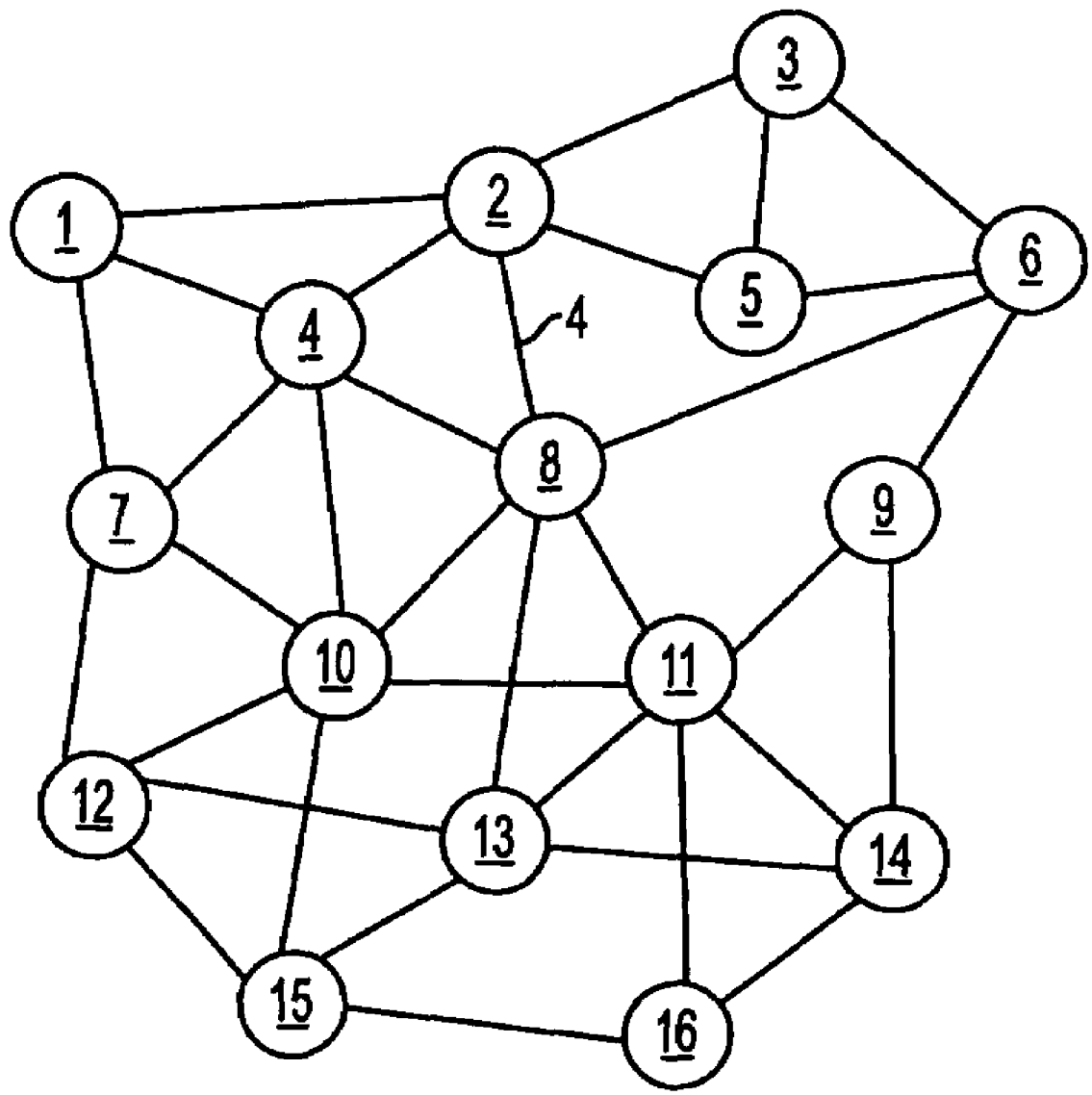
FIG. 7 depicts a undirected node graph.

Exemplary embodiments of the present invention also provide techniques and mechanisms for partitioning a print job based on object reuse. An example will be described in connection with the flow diagram of FIG. 6. As described previously, an object usage profile is generated during analysis of the print job. According to certain exemplary embodiments, this object usage profile contains a list of objects and the pages on which they are used. Transposing this usage profile produces the object usage list for each page at step 60. From these lists, a undirected graph is built in which each node represents a page at step 62. A conceptual diagram of a undirected graph is provided as FIG. 7. Therein, it can be seen that links connect each of the sixteen nodes (pages). Each link is assigned a weight based on, for example, the number and/or size of the common objects between the link's two page nodes. For example, page 2 and page 8 may have four common objects. According to one exemplary embodiment of the present invention, the link weight assigned to the link between nodes 2 and 8 can have a value of four, as shown in FIG. 7. According to an alternative embodiment of the present invention, the sum of the sizes of the common objects can be used as the link weight to depict the shared cache space. According to yet another alternative embodiment, some combination of the number of common objects and their sizes can be used to assign a link weight. Regardless of the manner in which the link weights are assigned, a minimum cut set algorithm is then applied to the undirected graph at step 64 to determine the balanced partitioning (page grouping) that minimizes the sum of weights of the links crossing partition groupings and conversely maximizes the sum of link weights of the pages grouped together. This corresponds to the partitioning which minimizes the number of common objects shared between page groupings and/or their corresponding object size.

In order to partition into N sets, e.g., associated with n RIP processors, it is desirable to use a minimum cut set algorithm that is designed to flexibly partition a undirected graph into N sets. Moreover, it is also desirable for exemplary embodiments of the present invention that the N sets be balanced, i.e., wherein each page group partition contains the same number of pages (or maximum variance of one page if the number of pages is not equally divisible by the number of partitions) and that the minimum cut set algorithm be able to generate balanced groupings without deadlocking. Accordingly, the following exemplary minimum cut set algorithm performs this task, which algorithm can be used to perform print job partitioning according to exemplary embodiments of the present invention.

Figure 8A:
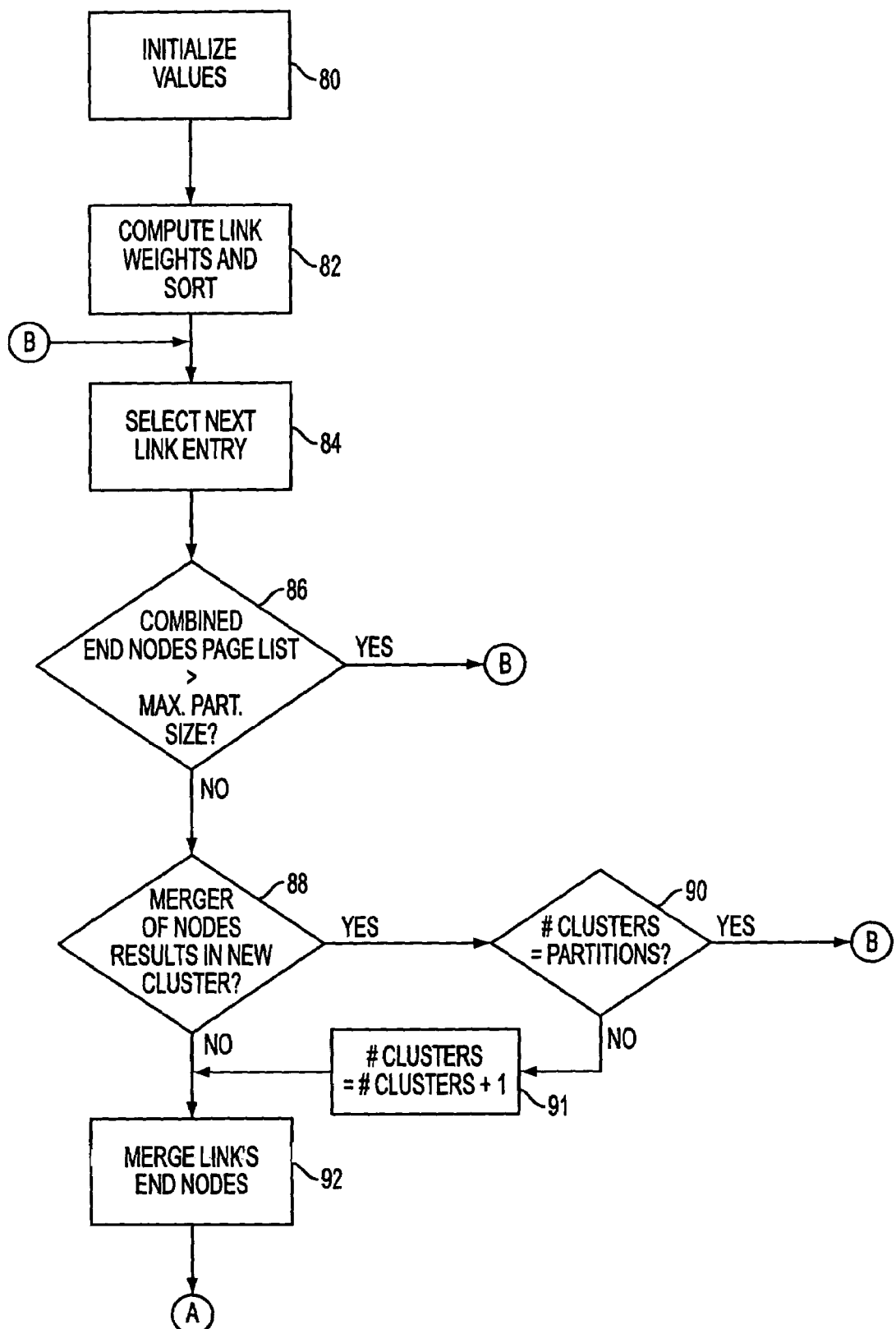
FIGS. 8(a) and 8(b) show a flowchart which illustrates a N-partition minimum cut set algorithm according to an exemplary embodiment of the present invention.
Figure 8B:
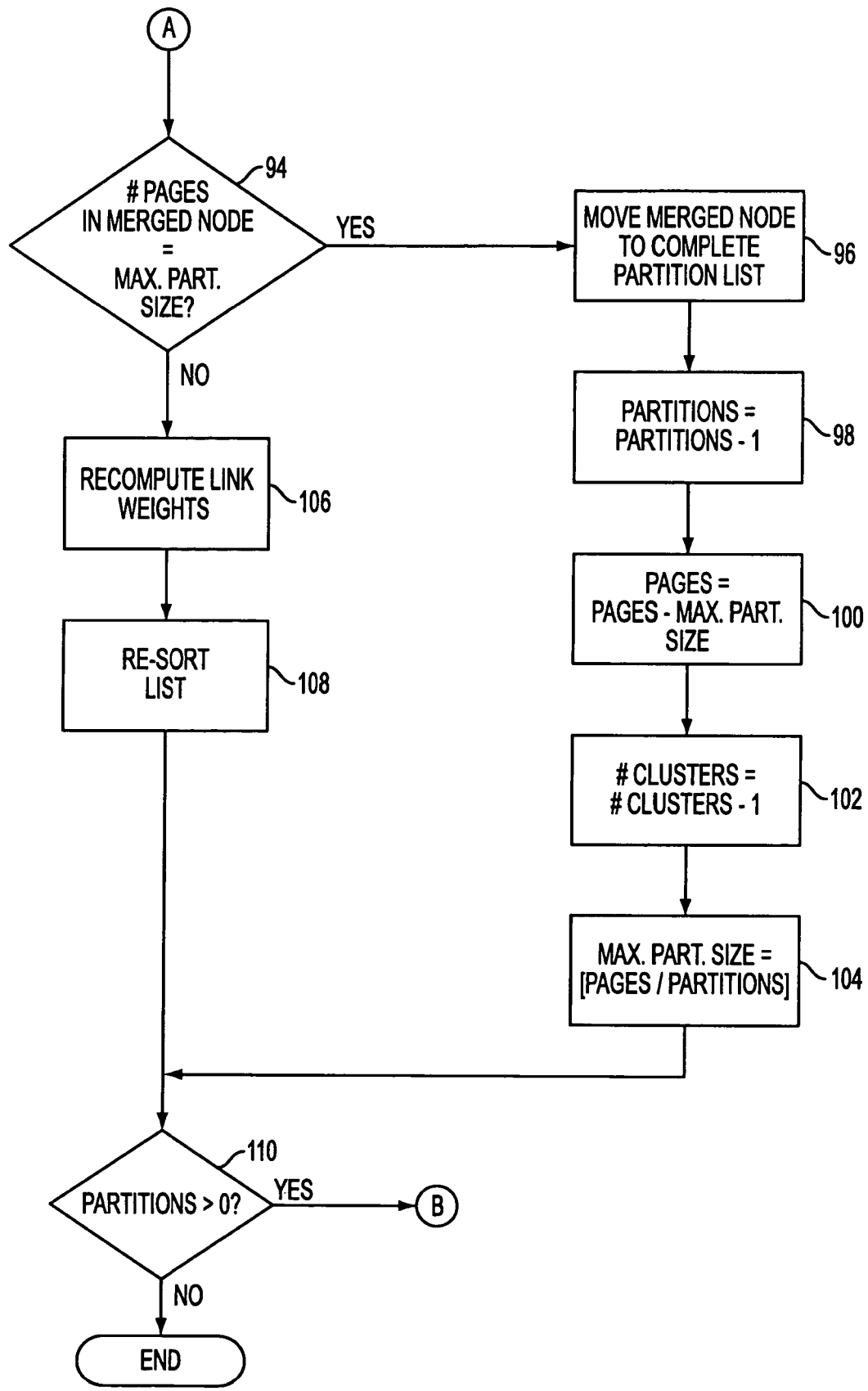

Referring now to the flow diagram of FIG. 8, at step 80, each page in the print job(s) is allocated a graph node, the node's page list is initialized to the current page and the node's object list is initialized to the current page's object list. Additionally algorithm variables are initialized by setting partitions=number of desired partitions, pages=number of pages, maximum partition size=[pages/partitions], number of clusters=0 and the complete partition list=NULL. Next, at step 82, the link weights are computed between all two-node combinations and sorted into an indexed list in order of decreasing value. From the top of the sorted list, at step 84, a first link entry is selected and evaluated to determine whether its combined end node's page lists do not exceed the maximum partition size (step 86) and whose merger will not result in a new cluster if the number of clusters equals the value held in partitions (steps 88 and 90). The condition in which a new cluster is produced is when both end nodes of the selected link each contain only one page in their respective page lists. If the number of clusters is less than the value held in partitions at step 90, then the number of clusters is incremented at step 91.

Assuming that the selected link entry meets these conditions, i.e., follows a "no" path through decision blocks 86-90, then the flow moves on to step 92. Therein, the selected link's end nodes are merged together by merging the second node's page and object lists into the first node's lists. The second node and its associated links are then deleted. The object lists of the first and second nodes can be merged using a bitwise OR operation, such that no duplicate object entries exist in the list. In addition, the number of clusters is decremented by one if both nodes contain more than one page in their respective page lists.

At step 94, if the number of pages in the merged node's page list is equal to the maximum partition size, then the merged node defines a complete partition and is removed from any further processing. This is done by moving it to the complete partition list at step 96 and removing its associated links. Further, the number of partitions is decremented by one (step 98), the maximum partition size is subtracted from pages (step 100), the number of clusters is decremented by 1 (step 102), and the maximum partition size is recomputed using the ceiling function of the new partition and pages values (step 104). Alternatively, if the number of pages in the merged node's page list does not equal the value stored in maximum partition at step 94, then the flow moves to steps 106 and 108 where the link weights associated with the merged node are recomputed and repositioned into the sorted list. Note that since link weights for the merged node will either stay the same or increase in value, repositioning of the updated links involves sorting from the currently selected link's position upward toward the top of the list. Also, any updated link whose combined end node's page lists will exceed the maximum partition size in length can be dropped. The flow then moves to the decision block 110 wherein the process is repeated if the value of partitions is greater than zero. Otherwise processing of this print job or jobs is complete. Once processing is complete, the partitions are listed in the complete partition list as nodes with each node's page lists containing the partition's pages and a balanced partition has been created which groups pages together in a manner which enables the down stream processor/caching system to maximize cache efficiency.

An Example: A PDF Embedded Object Usage Profile Specification

This section presents one exemplary application of the above-described object usage profile for the specific case of PDF documents. Those skilled in the art will appreciate that this detailed example is intended to be purely illustrative and that object usage profiles according to the present invention can be implemented in various other ways. In this exemplary embodiment, object reuse information is embedded as an additional object in the PDF document and is intended to augment the cross reference (xref) table, while also being compatible with existing and future PDF interpretation systems. Two aspects of embedding exemplary usage profile information within a PDF file are described: specifically its location and its format.

Object Usage Profile Location:

This exemplary object usage profile is added as an object to the PDF file with object number such that it will occupy the last entry in the cross reference (xref) table. This can take the form of extending the xref table with an additional entry, or using the versioning capability to append the additional entry using the "/Prev" reference in the trailer to link the tables. In either case, the entry will follow the standard valid xref entry form, i.e., it will have the following characteristics:

1. 10 digit byte offset (including leading zeros) from the beginning of the file to the Usage Profile Object.
2. 5-digit generation number (including leading zeros) corresponding to the latest version of the document.
3. Single character value entry ("n") designator.
4. Single space character between offset, generation number, and valid flag.
5. Two character end-of-line termination string. Either a space followed by a new line, or a carriage return follow by a new line ("\n" or "\r\n").
6. Entry will total exactly 20 characters.

In addition, the exemplary PDF usage profile object will not be directly or indirectly referenced by any other object in the PDF document. The exemplary PDF usage object profile will also contain a stream object with its first entry being the "/ObjUsageProfile" keyword. Note the stream object may be compressed as specified in the stream object dictionary. The "/ObjUsageProfile" can, for example, be in compressed form in this case and will need to be first decompressed when used.

Thus the exemplary PDF usage profile object can be identified, by accessing the last xref entry, verifying that it is valid and verifying that it contains a stream object starting with the keyword "/ObjUsageProfile" when in non-compressed form. Note the exemplary PDF usage profile object is intended to augment the cross reference table. Thus it is has been designed in this example to be read once after loading the cross reference table.

Usage Profile Object Format:

The usage profile of the file's objects can be presented as a stream object within the exemplary PDF usage profile object. An exemplary usage profile stream object can be generated in accordance with the following convention:

1. The stream object consists of two parts: a dictionary (delimited with "<<" a ">>"), followed by zero or more bytes of data delimited with the "stream" and "endstream" keywords.
2. The stream object dictionary can include at least the "/Length" command specifying the exact number of bytes of the stream data bytes (excluding the "stream" and "endstream" delimiters and their corresponding end-of-line characters). The stream data bytes can be compressed and the corresponding "/Filter" information can be contained in the stream object dictionary. An exemplary compression technique for the stream data bytes is Flate encoding, and thus "/Filter/FlateDecode" can be included in the dictionary, however any PDF supported lossless compression method may be used.
3. The "stream" delimiter can be followed by an end-of-line sequence (carriage return followed by a new line or simply just a new line) with the data stream beginning on the next successive byte.
4. Following the stream data, the "endstream" delimiter can either immediately follow the last byte of the data stream, or be preceded by an end-of-line marker sequence.

Exemplary usage profile stream data can have the following form (after being decompressed if the stream is in compressed form within the file):

1. The usage profile stream can begin with the key "/ObjUsageProfile" followed by a usage profile dictionary (delimited with "<<" and ">>").
2. The usage profile dictionary can be composed of a series of subsections each containing entries corresponding to contiguous object numbers. The subsections can have a form similar to the xref table but differ in the subsection entry contents. The subsection form is defined as follows:

a. Each subsection can begin with a two integer header with a single space separator and end-of-line sequence termination. The first number is the starting object number for that subsection and the second is the number of entries in that subsection.
b. Following the header, each subsection entry contains the number of references to that corresponding object that will occur during processing of the file.
c. Each subsection entry may optionally also contain an array (bracketed with '[' and ']'), listing the page numbers in which the corresponding object is used. The syntax for this array is as follows:
   i. The array page numbers are separated with white space characters (space, tab, newline, etc.).
   ii. Multiple instances of the same page numbers may exist in the same array, indicating that the object is used multiple times on that page.
   iii. The length of the array will equal the number of uses specified for that object.
   iv. The page numbers of the array is presented in ascending order.
   v. Page number zero corresponds to references occurring before the first page (e.g. reference to /Info object), and page numbers greater than the number of pages in the document specifies uses of the object after the last page is complete (e.g. bookmarks objects).

Figure 9:
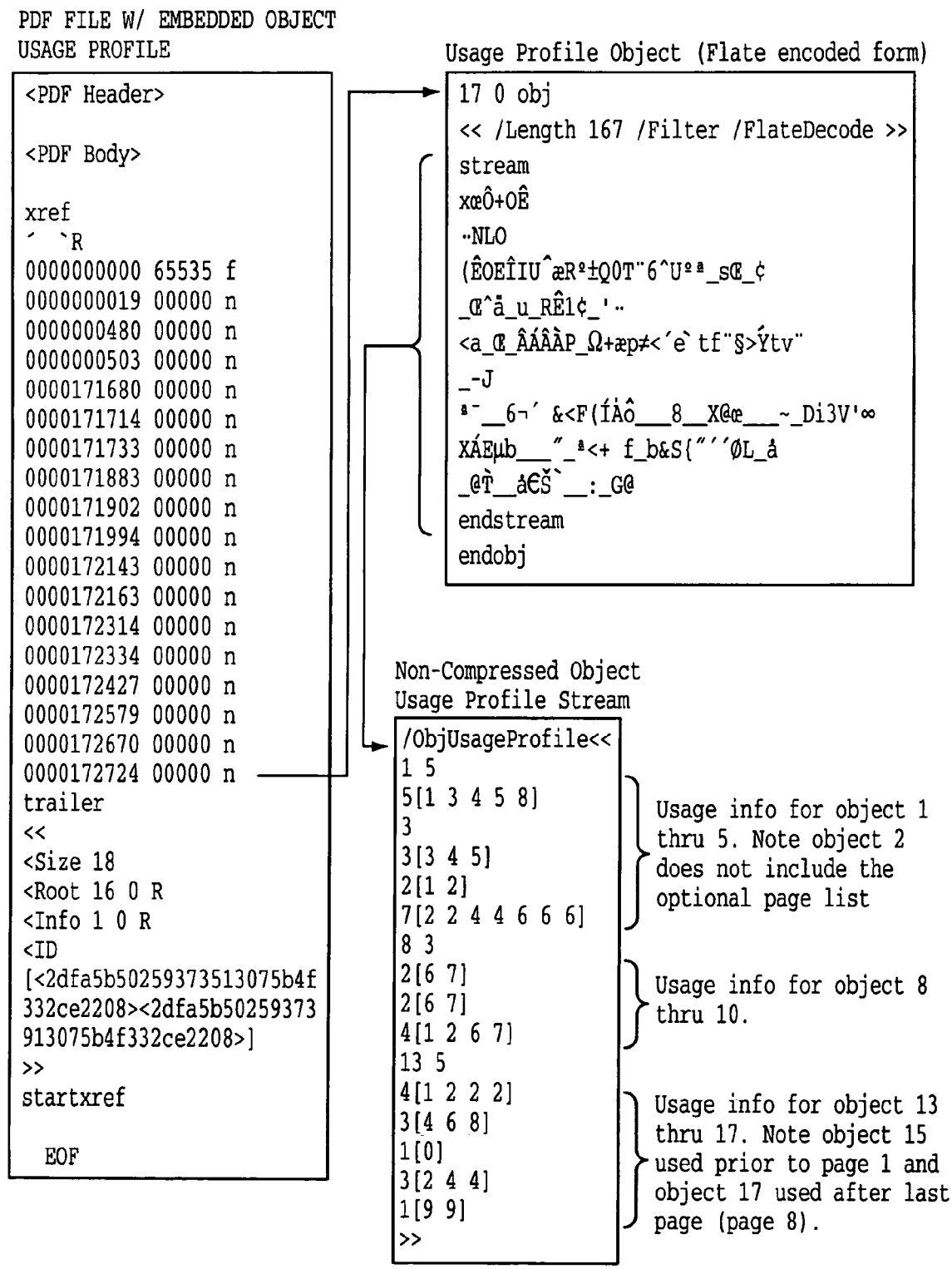
FIG. 9 shows an exemplary PDF file with embedded reuse information according to an exemplary embodiment of the present invention.

Note, not all valid objects presented in the xref table are required to have a corresponding entry in the usage profile stream. In addition invalid objects may be included within a usage profile stream subsection and because they are ignored, may have any reference count and page array list. FIG. 9 presents an example using the above-described format. Therein, the last reference of the xref table indexes the Usage Profile Object that has been Flate encoded (compressed). Once decoded, the number and pages on which each object is used can be accessed.

Systems and methods for processing print jobs according to exemplary embodiments of the present invention can be performed by processors, e.g., RIP pre-processor 34, executing sequences of instructions contained in a memory device (not shown). Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for processing a print job comprising the steps of:
   selecting an object in said print job;
   determining whether said object has a match among previously processed objects;
   selectively incrementing a number of usages of said object based upon a result of said determining step; and
   partitioning said print job based upon said number of usages.

2. The method of claim 1, wherein said print job comprises a page description language (PDL) file.

3. The method of claim 1, wherein said print job includes at least one of: a plurality of pages and a plurality of documents.

4. The method of claim 1, wherein said object is an image.

5. The method of claim 1, wherein said step of determining whether said object has a match among previously processed objects further comprises the steps of:
   generating a signature associated with said object; and
   comparing said signature with other signatures stored in an object table.

6. The method of claim 1, wherein said step of selectively incrementing said number of usages of said object based upon a result of said determining step further comprises the step of:
   incrementing a value stored in an object reuse field of an object table.

7. The method of claim 1, wherein said step of selectively incrementing said number of uses of said object based upon a result of said determining step further comprises the step of:
   adding a page number, which indicates where said object is used in said print job, to a list of page numbers associated with said object.

8. The method of claim 1, further comprising the step of:
   caching said object based upon said number of usages.

9. The method of claim 1, further comprising the steps of:
   grouping pages with common objects into a partition; and
   balancing a number of pages between partitions.

10. The method of claim 1, further comprising the step of:
    transforming said object, prior to said step of determining, into a predetermined coordinate system and at least one predetermined sequence of rendering operations.

11. A system for processing a print job comprising:
    a processor for selecting an object in said print job and determining whether said object has a match among previously processed objects; and
    an object table for storing information associated with said print job, wherein said processor selectively increments a number of usages of said object based upon whether said object has said match, wherein said processor partitions said print job based upon said number of usages.

12. The system of claim 11, wherein said print job comprises a page description language (PDL) file.

13. The system of claim 11, wherein said print job includes at least one of: a plurality of pages and a plurality of documents.

14. The system of claim 11, wherein said object is an image.

15. The system of claim 11, wherein said processor also generates a signature associated with said object and compares said signature with other signatures stored in said object table.

16. The system of claim 11, wherein said processor selectively increments said number of usages of said object by incrementing a value stored in an object reuse field of an object table.

17. The system of claim 11, wherein said processor selectively increments said number of uses of said object by adding a page number, which indicates where said object is used in said print job, to a list of page numbers associated with said object in said object table.

18. The system of claim 11, further comprising:
    a cache memory unit for caching said object based upon said number of usages.

19. The system of claim 11, wherein said processor grouping pages with common objects into a partition and balances a number of pages between partitions.

20. The system of claim 11, wherein said processor transforms said object, prior to said determining whether said match exists, into a predetermined coordinate system and at least one predetermined sequence of rendering operations.

21. A computer-readable medium containing a program that performs the steps of:
selecting an object in a print job;
determining whether said object has a match among previously processed objects;
selectively incrementing a number of usages of said object based upon a result of said determining step; and
partitioning said print job based upon said number of usages.

22. The computer-readable medium of claim 21, wherein said print job comprises a page description language (PDL) file.

23. The computer-readable medium of claim 21, wherein said print job includes at least one of: a plurality of pages and a plurality of documents.

24. The computer-readable medium of claim 21, wherein said object is an image.

25. The computer-readable medium of claim 21, wherein said step of determining whether said object has a match among previously processed objects further comprises the steps of:
generating a signature associated with said object; and
comparing said signature with other signatures stored in an object table.

26. The computer-readable medium of claim 21, wherein said step of selectively incrementing said number of usages of said object based upon a result of said determining step further comprises the step of:
incrementing a value stored in an object reuse field of an object table.

27. The computer-readable medium of claim 21, wherein said step of selectively incrementing said number of uses of said object based upon a result of said determining step further comprises the step of:
adding a page number, which indicates where said object is used in said print job, to a list of page numbers associated with said object.

28. The computer-readable medium of claim 21, further comprising the step of:
caching said object based upon said number of usages.

29. The computer-readable medium of claim 21, further comprising the steps of:
grouping pages with common objects into a partition; and
balancing a number of pages between partitions.

30. The computer-readable medium of claim 21, further comprising the step of:
transforming said object, prior to said step of determining, into a predetermined coordinate system and at least one predetermined sequence of rendering operations.

31. A method for processing a print job comprising the steps of:
selecting an object in said print job;
determining whether said object has a match among previously processed objects; and
selectively incrementing a number of usages of said object based upon a result of said determining step, wherein said step of selectively incrementing said number of uses of said object based upon a result of said determining step further comprises the step of;
adding a page number, which indicates where said object is used in said print job, to a list of page numbers associated with said object.

32. A system for processing a print job comprising:
a processor for selecting an object in said print job and determining whether said object has a match among previously processed objects; and
an object table for storing information associated with said print job, wherein said processor selectively increments a number of usages of said object based upon whether said object has said match, wherein said processor selectively increments said number of uses of said object by adding a page number, which indicates where said object is used in said print job, to a list of page numbers associated with said object in said object table.

33. A computer-readable medium containing a program that performs the steps of:
selecting an object in a print job;
determining whether said object has a match among previously processed objects; and
selectively incrementing a number of usages of said object based upon a result of said determining step, wherein said step of selectively incrementing said number of uses of said object based upon a result of said determining step further comprises the step of:
adding a page number, which indicates where said object is used in said print job, to a list of page numbers associated with said object.

* * * * *